Oct. 3, 1933. F. RIEBEL, JR., ET AL Re. 18,962

BAG COUPLING

Original Filed May 28, 1931

INVENTOR.
Frederick Riebel Jr. and
BY Dewey M. Dow
Fay Oberlin & Fay
ATTORNEYS.

Reissued Oct. 3, 1933 Re. 18,962

UNITED STATES PATENT OFFICE 18,962

BAG COUPLING

Frederick Riebel, Jr., and Dewey M. Dow, Toledo, Ohio, assignors to Air-Way Electric Appliance Corporation, Toledo, Ohio, a corporation of Delaware Original No. 1,900,366, dated March 7, 1933, Serial No. 540,525, May 28, 1931. Application for reissue May 29, 1933. Serial No. 673,569

7 Claims. (Cl. 285—71)

The present invention relating as indicated to an improved bag coupling, has more precise reference to a novel form of coupling or adapter to engage with the inlet opening of dust collecting bags used in vacuum cleaner construction. The form of coupling embodying the principle of the invention is most particularly contemplated to be used with a sanitary porous paper dust collecting bag. Heretofore a great amount of trouble and inconvenience has been experienced with bag couplings due to the fact that a satisfactory connection could not be obtained between the inlet mouth of the bag and the vacuum cleaner fan casing outlet. The chief disadvantage of such couplings existent in the prior art were that pockets and recesses in the bag mouth were formed in such a manner that the dirt and dust would collect therein and a sanitary connection in a true sense of the word was therefore not obtainable.

It is the general object and nature of our present invention to provide a type of adapter or coupling which will form a convenient and readily removable connection with the bag mouth as well as to render a secure, air-tight and sanitary joint. Further advantages shall become apparent as the description proceeds. To the accomplishment of the foregoing and related ends, said invention, then, consists of the means hereinafter fully described and praticularly pointed out in the claims.

Figure 1:
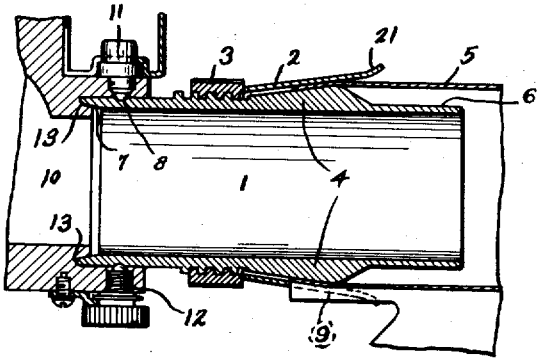
Fig. 1 is a sectional view of one form of coupling embodying the principle of our invention.
Figure 6:
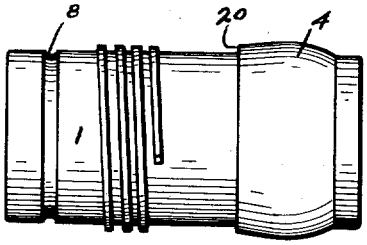
Fig. 6 is an exterior plan view of the form of inner tube employed in the constructions shown in Figs. 2 and 3.

Referring more particularly to the drawing, our device consists essentially of the inner tube member indicated generally at 1, having the outer tapered sleeve 2 fitted thereover with the threaded securing ring 3 adapted to removably secure the sleeve 2 in position. The inner tube 1 possesses a medial annular enlargement 4 which is adapted to be inserted within the mouth of the inlet neck 5 of a filter bag. As shown in Fig. 1, the cylindrical extension 6 may be added to the inner tube 1 in order to accommodate a hose adapter.

The fan casing end of the inner tube 1 is interiorly bevelled as at 7 and has an external circumferential groove 8 which bevelled edge and groove are intended to facilitate engagement with a vacuum cleaner fan casing outlet or other delivery conduit for the dust laden air stream that is handled by a vacuum cleaner, indicated generally at 10. Positioned in the fan casing outlet 10 or other delivery conduit for the dust laden air stream that is handled by a vacuum cleaner are the spring mounted ball-retaining means 11 and the knurled thumb screw 12 which are adapted to engage with the circumferential groove 8. An annular tapered trough 13 forms a complementary recess for the reception of the tapered end 7 of the tube 1.

There are two types of known dust delivery conduits in vacuum cleaners, one of the type formed on the fan case, and the other embodied in a cleaner wherein the dust is sucked into a collecting bag by a fan which exerts suction against the exterior of the bag, the conduit in this case being a delivery connection to the chamber or casing in which the bag is carried.

Figure 5:
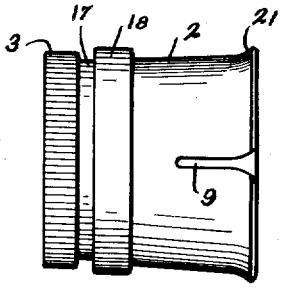
Fig. 5 is an exterior plan view of the form of tapered outer sleeve employed in the form of construction shown in Fig. 3.

As most clearly illustrated in Fig. 5, a longitudinal notch 9 is provided in the tapered sleeve 2, opening into the larger end thereof. The purpose of the notch 9 is to receive the laterally extending section of the bag neck 5.

Figure 2:
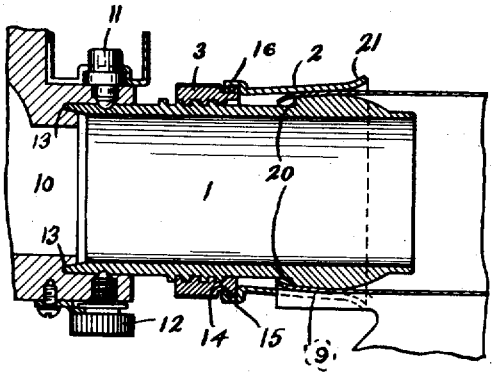

In order to minimize the number of separable parts employed in our device, the construction shown in Fig. 2 may be resorted to wherein an annular groove 14 and flange 15 on the ring 3 are adapted to permanently and rotatably engage in a complementary circumferential channel 16 on the inner end of the outer sleeve 2.

Figure 3:
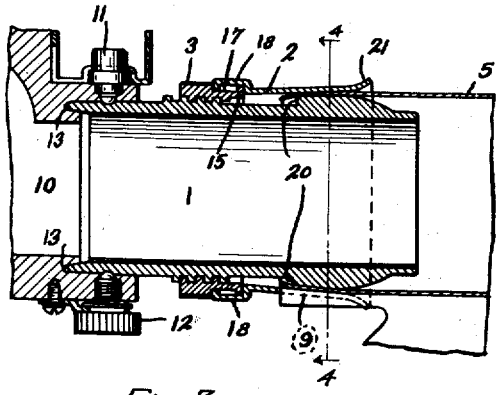
Figs. 2 and 3 are sectional views of alternative forms of construction.
Figure 4:
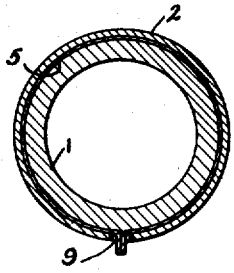
Fig. 4 is a section taken substantially upon line 4—4 of Fig. 3.

In the construction shown in Fig. 2, the sleeve 2 and ring 3 are shown secured together with practically no longitudinal movement therebetween. In order to aid in forming contact of the threaded ring 3 with the threads on the tube 1 when the outer sleeve is inserted thereover, the construction shown in Fig. 3 is employed. It will be seen that in such construction the annular groove 17 is much wider than the flange of the circumferential channel 18 on the sleeve 2. Likewise the channel 18 possesses a materially increased width. In this manner there will be affected a substantial amount of relative longitudinal motion between the sleeve 2 and the ring 3. The last described type of construction offers the further advantage in that upon removal of the outer sleeve 2 from contact with the conical portion 4, the ring 3 will be permitted to acquire a substantially complete engagement with the threads on the tube 1. Since, upon installation of the bag coupling the sleeve 2 is wedged into contacting position, there will be required a certain amount of counteracting force in order to effect a removal thereof. It will thus be seen that in the disconnecting operation of the construction shown in Fig. 3 that sufficient force to remove the outer sleeve 2 from its wedged position is all that will have to be exerted upon the threaded ring 3 whereas in the form of construction shown in Fig. 2, additional or cumulative force will be necessary in order to overcome the initial tightening resistance of the threads on the ring 3.

In order to effect a more secure retention of the margins of the bag neck 5, a transverse annular shoulder 20 is positioned adjacent the conical portion 4. The presence of such shoulder 20 serves to act as a snubbing point which greatly increases the retaining contact of the coupling.

The outer edge of the tapered sleeve 2 is flared into the bell mouth 21 in order to serve as a guide when the sleeve is placed in position over the bag neck 5.

It is to be noted that an annular space is formed between the sleeve 2 and the tube 1, extending axially thereof from the shoulder 20 to the ring 3, in those constructions shown in Figs. 2 and 3, as contrasted with that shown in Fig. 1.

The annular space serves to receive the constricted end portion of the paper bag neck and will allow the same to wrinkle longitudinally in order to conform to the constricted interior surface of the reduced end of the sleeve 2. Since a bag neck of sufficient diameter to embrace the widest portion of the annular enlargement 4 must be employed, there will of necessity be a certain amount of wrinkling in the end portion of the bag neck as it is contracted into the restricted space within the sleeve 2. Employment of the construction shown in Figs. 2 and 3 provides a relatively narrow annular region of wedging contact between the sleeve and the annular enlargement 4 and this wedging contact is had in the region of the largest diameters of the co-acting members, where the bag neck will be stretched smoothly and without wrinkles. This obviates any tendency of the wrinkled end portion of the bag neck to assume the burden of wedging connection between the sleeve and annular enlargement, which would result in a poorly sealed connection in which air and particles of dust could escape through the longitudinal channels formed by such wrinkles.

The annular enlargement 4 is formed with a conical nose facing toward the projecting end of the coupling tube 1. Between this conical nose and the flared portion 21 of the sleeve 2, or the projecting larger end of the sleeve, there is formed a bag neck receiving mouth which opens axially toward the projecting end of the coupling and which is flared both radially outwardly and radially inwardly so as to facilitate the introduction of a bag neck into said mouth. In applying a bag neck to the coupling, the projecting end of the tube 1 is first inserted into the bag neck and as the latter is pushed over the tube, the conical nose of the enlargement 4 will spread the bag neck until the latter is engaged and again contracted inwardly by the projecting larger end of the sleeve 2. This is done while the sleeve is in a retracted position, and when the bag neck is in proper position, around the enlargement 4, the sleeve is moved axially into wedging engagement therewith and tightened by means of the securing ring 3.

An advantage of the lost motion connection between the channel 18 and flange 15 shown in Fig. 3, in connection with a relatively short coupling conduit removably attachable to a fan casing outlet, is that of facilitating the loosening of the wedging connection between the sleeve and the bag. To this end, the coupling may first be dissociated from the fan casing outlet and the securing ring 3 retracted toward the fan casing end of the tube 1 as far as the channel 18 will permit. The operator, by holding the sleeve 2 in one hand and striking a sharp blow with the other hand against the fan casing end of the tube 1, may loosen an unusually tight connection much more easily than could be accomplished by employing the securing ring as a pulling medium.

The present invention is particularly useful in connection with a dust collecting apparatus of the type in which the porous paper dust collecting bag is enclosed in and supported by an outer bag of cloth or the like such as is shown in our Patent No. 1,905,059, issued April 25, 1933. In connection with such a dust collecting apparatus, the neck of the outer bag may be enclosed around the intermediate region of the sleeve 2 so as to embrace the same snugly, and the enlarged end of said sleeve will thence be snugly seated within the outer bag and will resist any tendency of the outer bag to recede axially from the coupling. Such a tendency will be caused by the stretching of the outer bag to accommodate the coupling, and is due to the resilient nature of the bag walls tending to pull back to a normal unstretched state.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. A suction cleaner bag coupling comprising a tube forming a continuation of a dust laden air stream delivery conduit of said cleaner, an annular enlargement formed on said tube toward its projecting end, a sleeve encircling said tube between said conduit and said projecting end, said sleeve being tapered outwardly toward said end and slidable axially on said tube, an intermediate region of the interior tapered surface thereof being adapted to contact the exterior surface of said enlargement, and means located between said conduit and projecting end of said tube, to axially advance and securely hold said sleeve in engagement with a bag neck received between said sleeve and said enlargement.

2. A suction cleaner bag coupling comprising a tube forming a continuation of a dust laden air stream delivery conduit of said cleaner, an annular enlargement formed on said tube toward its projecting end, a sleeve encircling said tube between said conduit and said projecting end, said sleeve being tapered outwardly toward said end and slidable axially on said tube, an intermediate region of the interior tapered surface thereof being adapted to contact the exterior surface of said enlargement, said enlargement being formed with a conical nose facing toward said projecting end of the tube and the larger end of the sleeve projecting over said nose when the sleeve engages the enlargement and forming therewith an axially opening, annular mouth, and means located between said conduit and projecting end of said tube, to axially advance and securely hold said sleeve in engagement with a bag neck received between said sleeve and said enlargement.

3. A suction cleaner bag coupling comprising a tube forming a continuation of a dust laden air stream delivery conduit of said cleaner, an annular enlargement formed on said tube toward the projecting end thereof, a sleeve encircling said tube between said conduit and said projecting end, said sleeve being tapered outwardly toward said end and axially slidable on said tube to a position where a bag neck received between said sleeve and the enlargement will be engaged between the tapered inner surface of the sleeve and an axially narrow annular region of the outer surface of said enlargement, the outer portions of the sleeve and tube forming between them, an axially opening, bag neck receiving mouth, and means located between said conduit and projecting end of said tube, to axially advance and securely hold said sleeve in such engagement.

4. A suction cleaner bag coupling comprising a tube forming a continuation of a dust laden air stream delivery conduit of said cleaner, an annular enlargement formed on said tube toward the projecting end thereof, a sleeve encircling said tube between said conduit and said projecting end, said sleeve being tapered outwardly toward said end and axially slidable on said tube to a position where a bag neck received between said sleeve and the enlargement will be engaged between an intermediate region of the tapered inner surface of the sleeve and the exterior surface of said enlargement, said enlargement being formed with a conical nose facing toward said projecting end of the tube, and the larger end of the sleeve being formed with an outwardly flared portion projecting over said nose when the sleeve engages the bag neck against the enlargement, and forming therewith an annular, axially opening, radially outwardly and radially inwardly flaring mouth, and means located between said conduit and projecting end of said tube, to axially advance and securely hold said sleeve in such engagement.

5. A suction cleaner bag coupling comprising a tube forming a continuation of a dust laden air stream delivery conduit of said cleaner, an annular enlargement formed on said tube toward the projecting end thereof, a sleeve encircling said tube between said conduit and said projecting end, said sleeve being tapered outwardly toward said end and axially slidable on said tube to a position where a bag neck received between said sleeve and the enlargement will be engaged between the sleeve and said enlargement, a radially inwardly opening channel formed on the smaller end of said sleeve, and a securing nut threadably encircling said tube and provided with a radially outwardly projecting annular flange swivelled in said channel, for moving said sleeve into bag neck engaging position.

6. A suction cleaner bag coupling comprising a tube forming a continuation of a dust laden air stream delivery conduit of said cleaner, an annular enlargement formed on said tube toward the projecting end thereof, a sleeve encircling said tube between said conduit and said projecting end, said sleeve being tapered outwardly toward said end and axially slidable on said tube to a position where a bag neck received between said sleeve and the enlargement will be engaged between the sleeve and said enlargement, said enlargement being cut away abruptly on its side toward said conduit, to form an annular shoulder positioned to engage between it and the inner tapered surface of the sleeve the neck of a paper dust collecting bag, along an axially narrow, annular portion of said neck, an annular space being formed between the sleeve and said inner tube, extending from said shoulder toward the constricted end of the sleeve, in which space the bag neck is relatively free to form longitudinal corrugations in conforming to the interior of the sleeve, and means located between said conduit and projecting end of said tube, to axially advance and securely hold said sleeve in such engagement.

7. A suction cleaner bag coupling comprising a tube forming a continuation of a dust laden air stream delivery conduit of said cleaner, an annular enlargement formed on said tube toward the projecting end thereof, a sleeve encircling said tube between said conduit and said projecting end, said sleeve being tapered outwardly toward said end and axially slidable on said tube to a position where a bag neck received between said sleeve and the enlargement will be engaged between the sleeve and said enlargement, a securing nut threadably encircling said tube adjacent the smaller end of said sleeve, and a lost motion rotatable connection attaching said nut to the small end of the sleeve, such as to allow limited axial movement of the sleeve relative to the nut, said tube terminating, beyond said nut opposite the projecting end, in a portion detachable from said conduit, whereby a blow struck against the end of said portion while the sleeve is being held, will serve to loosen wedging connection between said sleeve and the conical face.

FREDERICK RIEBEL, JR.
DEWEY M. DOW.